(12) United States Patent
Carreel et al.

(10) Patent No.: US 10,309,823 B2
(45) Date of Patent: Jun. 4, 2019

(54) THIN WEIGHING SCALE WITH A SANDWICH STRUCTURE

(71) Applicant: WITHINGS, Issy les Moulineaux (FR)

(72) Inventors: Eric Carreel, Meudon (FR); Thibaut Retiere, Carquefou (FR); Antoine Joussain, Paris (FR); Paul Edouard Juan, Paris (FR); Xavier Debreuil, Meudon (FR)

(73) Assignee: WITHINGS, Issy les Moulineaux (FR)

( * ) Notice: Subject to any disclaimer, the term of this patent is extended or adjusted under 35 U.S.C. 154(b) by 144 days.

(21) Appl. No.: 14/991,522

(22) Filed: Jan. 8, 2016

(65) Prior Publication Data
US 2017/0199073 A1    Jul. 13, 2017

(51) Int. Cl.
| G01G 21/23 | (2006.01) |
| G01G 21/24 | (2006.01) |
| G01G 3/14 | (2006.01) |
| G01G 19/44 | (2006.01) |

(52) U.S. Cl.
CPC .......... *G01G 3/1402* (2013.01); *G01G 19/44* (2013.01); *G01G 21/23* (2013.01); *G01G 21/244* (2013.01)

(58) Field of Classification Search
CPC ...... G01G 3/1402; G01G 19/44; G01G 21/23; G01G 21/244
See application file for complete search history.

(56) References Cited

U.S. PATENT DOCUMENTS

| 4,223,752 A * | 9/1980 | Belcher | G01G 1/243 177/211 |
| 4,355,692 A * | 10/1982 | Ostrelich | G01G 3/1402 177/211 |
| 4,411,326 A * | 10/1983 | Siegel | G01G 3/1412 177/211 |
| 4,433,741 A * | 2/1984 | Ryckman, Jr. | G01G 3/1402 177/199 |
| 4,800,973 A * | 1/1989 | Angel | G01G 3/1406 177/210 C |
| 4,819,750 A * | 4/1989 | Carnevale | G01G 19/44 177/208 |
| 4,880,069 A * | 11/1989 | Bradley | G01G 19/44 177/211 |
| 4,993,506 A * | 2/1991 | Angel | G01G 3/1402 177/211 |

(Continued)

FOREIGN PATENT DOCUMENTS

EP  0505493 A1  9/1992

*Primary Examiner* — Natalie Huls
(74) *Attorney, Agent, or Firm* — Miller, Matthias & Hull LLP

(57) ABSTRACT

A thin weighing scale having a thickness of less than 25 mm, comprising a first rigid bottom plate, extending along a reference plane defined by a first direction and a second direction, a second rigid top plate, at least four load cells 4, interposed between the first and second rigid plates, a set of linkages comprising arms, some arms extend in the first direction and some other arms extend in the second direction, each arm having an elongated shape with a first end attached to the first rigid plate and a second end rigidly connected to the second rigid plate, whereby a movement is provided along a third direction, the set of linkages preventing relative movement between first and second rigid plates along the first and second direction.

18 Claims, 4 Drawing Sheets

(56) References Cited

U.S. PATENT DOCUMENTS

| | | | | |
|---|---|---|---|---|
| 5,510,581 A * | 4/1996 | Angel | G01G 3/141 |
| | | | 177/211 |
| 6,211,472 B1 * | 4/2001 | Schulze | G01G 21/244 |
| | | | 177/154 |
| 6,797,894 B2 * | 9/2004 | Montagnino | G01G 21/22 |
| | | | 177/238 |
| 6,812,414 B2 * | 11/2004 | Nakagawa | G01G 19/44 |
| | | | 177/211 |
| 7,210,362 B2 * | 5/2007 | Tsutaya | G01G 3/14 |
| | | | 73/862.627 |
| 7,235,746 B2 * | 6/2007 | Williamson | G01G 19/44 |
| | | | 177/126 |
| 7,994,440 B2 * | 8/2011 | Oseko | G01G 3/1402 |
| | | | 177/238 |
| 8,639,226 B2 | 1/2014 | Withings | |
| 2004/0238236 A1 * | 12/2004 | Linglin | G01G 3/1402 |
| | | | 177/229 |
| 2005/0103535 A1 * | 5/2005 | Honda | G01G 21/23 |
| | | | 177/187 |
| 2010/0133016 A1 * | 6/2010 | Mannhart | G01G 23/3728 |
| | | | 177/25.12 |
| 2011/0209927 A1 * | 9/2011 | Honda | G01G 21/23 |
| | | | 177/225 |
| 2015/0107910 A1 | 4/2015 | Withings | |
| 2015/0160068 A1 * | 6/2015 | Carreel | G01G 3/1404 |
| | | | 177/1 |
| 2015/0338265 A1 * | 11/2015 | Carreel | G01G 19/50 |
| | | | 177/1 |
| 2016/0363475 A1 * | 12/2016 | Bedetti | G01G 19/44 |

* cited by examiner

THIN WEIGHING SCALE WITH A SANDWICH STRUCTURE

FIELD OF THE DISCLOSURE

The present invention relates to weighing devices and notably weighing scales, and more particularly the so-called bathroom electronic scales.

BACKGROUND OF THE DISCLOSURE

There is a constant trend to try to decrease the thickness of electronic scales. In the prior art, the electronic scales are provided with 4 feet bearing on the floor, tiles, carpet, etc. Each foot houses a load cell. One example of such configuration is given by document U.S. Pat. No. 4,800,973.

One problem arises when the overall thickness of the scale is decreased, because the height of the feet (i.e. clearance) is not large enough in case the scale is lying on a rather deep carpet, like in a bedroom fitted carpet, or on an uneven floor. If the underbody of the scale touches the floor, this results in an inaccurate, even substantially wrong, weight measurement.

Therefore, some attempts have been done to provide a so-called "sandwich structure" with a rigid top plate and a rigid bottom plate. The structure taught by US20100133016 exhibits shortcomings because the top plate may rub against the bottom plate which causes inaccurate weight measurement.

As a matter of fact, the issue is to prevent relative movement of bottom and top plates in any horizontal direction, while enabling a movement and an accurate weight measurement in the vertical direction.

According to EP0505493, the load cells themselves provide guidance to prevent movement in horizontal directions. However, it turns out that under the stress of a person standing on the scale, there are parasitic stresses which distort the measurement.

Therefore it remains a need to propose a sandwich structure weighing scale which exhibits a thickness of less than 25 mm, and which exhibits an improved accuracy.

SUMMARY OF THE DISCLOSURE

To this aim, there is disclosed a thin weighing scale having a thickness of less than 25 mm, comprising:
- a first rigid plate, extending along a reference plane defined by a first direction X and a second direction (Y),
- a second rigid plate, arranged parallel and at distance from the first rigid plate, with no direct contact between first and second rigid plates,
- at least four load cells, each interposed between the first and second rigid plates,
- a set of linkages comprising at least four arms, among which at least two arms extend in the first direction X and at least two other arms extend in the second direction Y, each arm having an elongated shape with a first end attached to the first rigid plate and a second end rigidly connected to the second rigid plate.

Thanks to these features, the second rigid plate is movably mounted with regard to the first rigid plate, substantially along a third direction (Z) perpendicular to the reference plane XY, the set of linkages (1) preventing substantial relative movement between first and second rigid plates along the first and second direction (X,Y), without distorting measurement.

Advantageously, the linkages provide guidance but do not distort the weight measurement.

In some embodiments, one might also use one or more of the following features:
- there may be provided at least two stop arrangement (3) with a part (31) rigid with (i.e. attached to) the first rigid plate and a counterpart (32) rigid with (i.e. attached to) the second rigid plate; hence, a limitation of relative movement along Z is provided when lifting the scale by top plate; therefore, cohesion is maintained;
- the set of linkages (1) may comprise at least two linking units (15,16), the at least four arms are formed in the linking units (cf FIG. 7); whereby the arms are arranged in assemblies that facilitate manufacturing and reduce costs;
- the set of linkages comprises four linking units (11;12; 13;14) (cf FIG. 2), each linking unit comprising two arms, one extending in the first direction X and one extending in the second direction Y; This turns out to be an optimal solution in terms of mechanical properties and manufacturing ease.
- each of the four abovementioned linking unit is preferably provided with a stop arrangement; the stop arrangement overall function is therefore particularly well balanced and the mechanical optimization of the design is improved and integration level is increased;
- The four linking units (11;12;13;14) are preferably L-shaped and each comprise a first arm and a second arm of similar length; this is a rather simple shape;
- The set of four linking units (11;12;13;14) exhibits a symmetry with regard to XZ plane and exhibits a symmetry with regard to YZ plane; this results in improved balance of linking function;
- the arms extend over more than ⅓ of the scale side length; The influence of arm flexion is therefore very small on the Z movement; Sin β≈β for small β angles, β being the off-plane deviation;
- the thickness of the weighing scale is less than 20 mm, preferably less than 18 mm. The scale occupies a very small height and can be stowed under nearly every piece of furniture;
- the first and/or second rigid plates is preferably flat and has a constant thickness; such plate is easy to manufacture and its cost is very low;
- the first rigid plate forms preferably the bottom plate; it can bear on nearly any type of surface, even or uneven, smooth or hard;
- the first rigid plate may be made of metal. It does not distort even on uneven floor, thus ensuring reliable and accurate measurement whatever the floor type;
- the second rigid plate may form the top plate;
- the second rigid plate may be made of glass; this material is non conducting, a conductive coating can be optionally applied on some areas to perform impedance measurement on barefoot user;
- the arms are preferably at the vicinity of the borders of the scale and the arms cover the peripheral area next to one another; The centre remains free for lodging ECU, battery, display and other ancillary equipment;
- the bottom plate may be slightly smaller in X Y than the top plate; this proves to facilitate grasp when one lifts the scale;
- the bottom plate and the top plate have substantially the same dimensions in XY; this renders the scale more attractive and enhances overall design;

the linking units may be L-shape (i.e. like a square bracket) and the internal corner lodges the corresponding load cell; this increases mechatronic integration.

BRIEF DESCRIPTION OF THE DRAWINGS

Other characteristics and advantages of the invention will readily appear from the following description of one of its embodiments, provided as a non-limitative example, and of the accompanying drawings.

On the drawings.

On the different Figures, the same reference signs designate like or similar elements.

DETAILED DESCRIPTION OF THE DISCLOSURE

Figure 1:
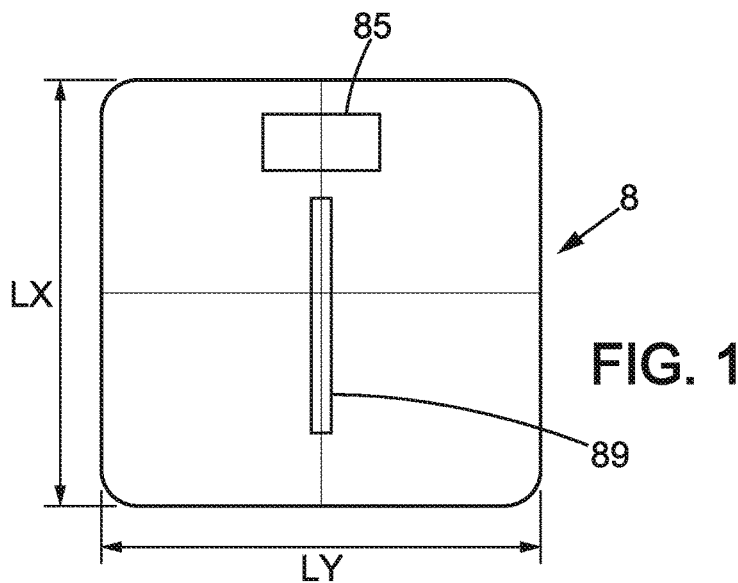
FIG. 1 is a top view of a weighing scale according to the present invention.

A personal weighing scale 8 according to the present invention is shown at FIG. 1-5. This scale is adapted to measure weights in the range between 10-300 kg, and the ideal resolutions are obtained within the range between 30-200 kg. This scale is also known as 'bathroom' scale although it can be used in a bedroom or in another room of a house. As it will be seen, it can advantageously be used on carpet floors, even deep carpet floor, and also on uneven floor.

The scale comprises a bottom plate 21 which is a rigid plate. The bottom plate 21 extends generally in a horizontal plane XY, defined by a first direction X and a second direction Y. Material of the bottom plate 21 is preferably metal, but can otherwise be selected among alloys, fiberglass, hard plastic, or any other suitable material. The bottom plate 21 has a generally rectangular shape, with side length comprised 25 cm and 35 cm. The length LX according to the first direction X can be comprised between 30 cm and 35 cm; the length LY according to the first direction Y can be comprised between 30 cm and 35 cm.

The bottom plate 21 exhibits a substantially constant thickness over most of its area, this thickness is comprised 3 mm and 5 mm.

There may be provided recessed portions 26,27,29 (thinner portions) the purpose of which will be explained later.

There are no feet provided under the bottom plate 21, although an anti-slip surface may be provided.

The scale includes a top plate 22 adapted with its shape and size for an object to be weighed. The scale is especially adapted for a personal use as a bathroom scale, although other uses are not excluded.

The top plate 22 of the scale thus may have a flat upper surface, so that a user may conveniently stand on the scale. The upper surface of the top plate 22 could also be textured, so that it roughly resembles contours of human feet, and/or the upper surface of the top plate 22 may be coated with a non-slippery material such as rubber or the like. Material of the top plate 22 is preferably glass but metal, plastic, or other suitable material might be considered.

The top plate 22 can be fitted with conductive pads, namely conductive areas obtained from ITO (Indium tin oxide) coating, for impedance measurements. The conductive pads are delimited by dotted line in FIG. 4; in the shown example two holes 88 are provided for electrical connections between the pads and the Electronic Control Unit ECU 7.

The holes and connections are covered by a thin stick-like cover 89.

The top plate 22 and the bottom plate 21 are spaced from one another; they are not in direct contact whatever the load applied.

The scale is provided with four load cells 4, each interposed between the first and second rigid plates at one respective corner. Load cells are described in more details later.

Preferably, the change of distance between the top plate 22 and the bottom plate 21 should be no more than 2 mm with a load up to 200 kg.

In the shown example, guidance between top plate 22 and the bottom plate 21 is provided by four linking units (11,12,13,14), which form together a set of linkages, denoted by reference 1.

Thanks to the linking units, the top plate 22 and the bottom plate 21 are movably mounted along the vertical direction Z (called 'third direction') perpendicular to the reference plane XY. Further, the set of linkages units 1 substantially prevents relative movement between top and bottom plates along the first and second direction X,Y.

Each linking unit 11-14 comprises at least two arms, one extending in the first direction X and one extending in the second direction Y.

Figure 2:
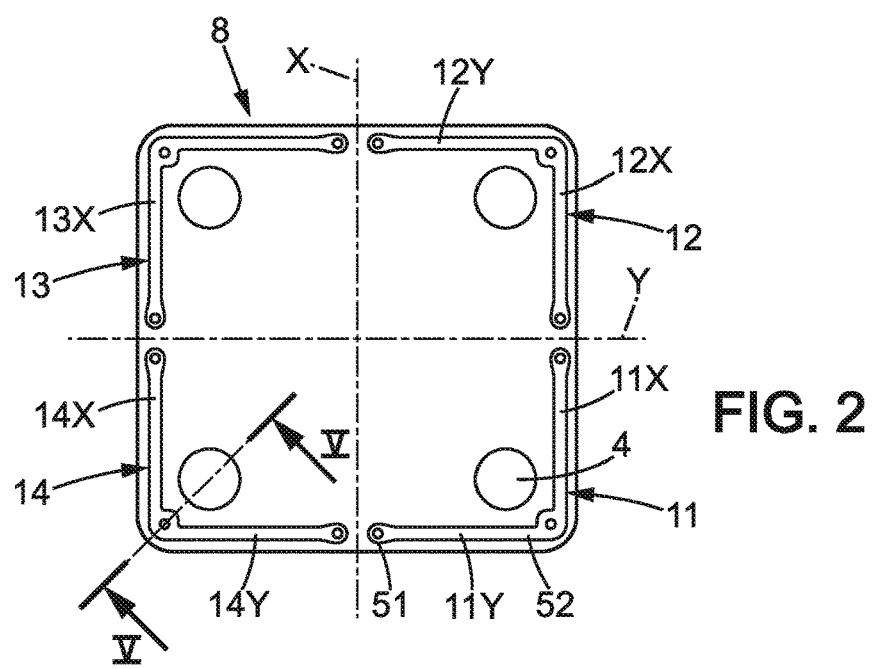
FIG. 2 is top sectional view of the weighing scale of FIG. 1.
Figure 3:
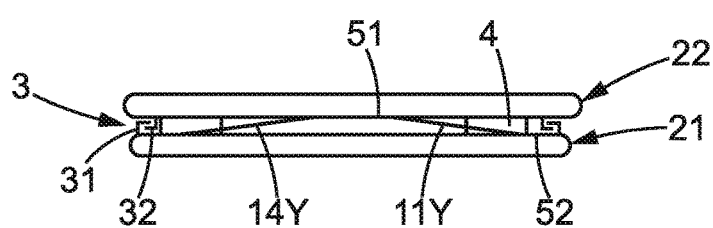
FIG. 3 shows an elevation schematic view of the device of FIG. 1; proportions of the device (especially in the z-direction are exaggerated for clarity purposes)
Figure 4:
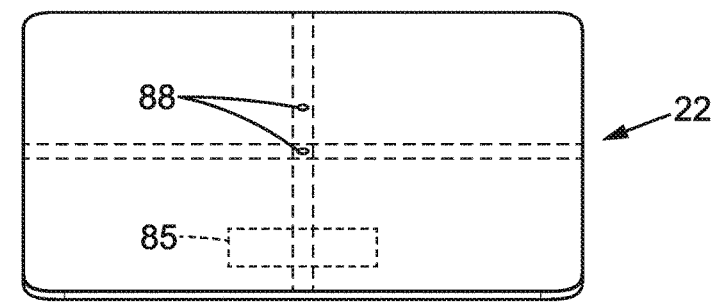
FIG. 4 is an exploded view of the device of FIG. 1.
Figure 4:
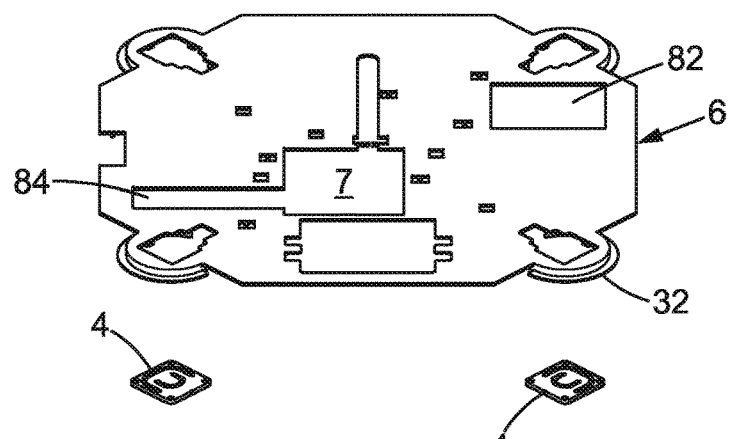
Figure 4:
Figure 4:
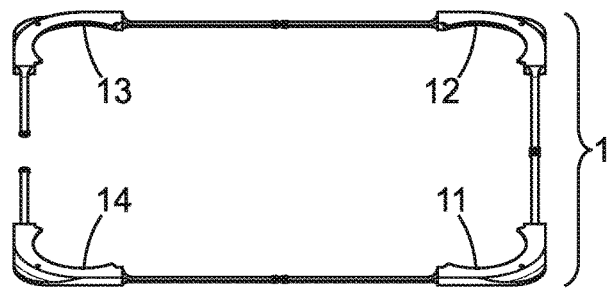
Figure 4:
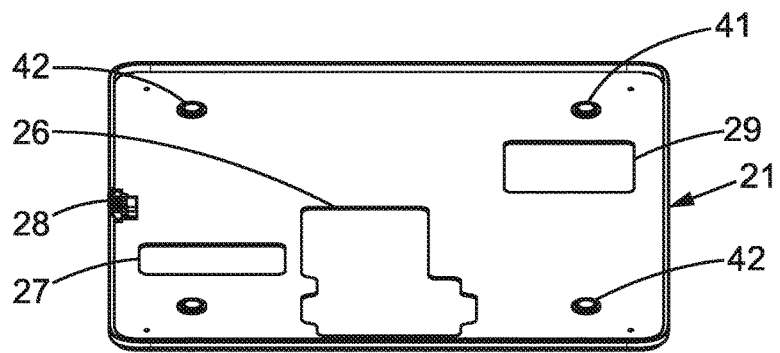
Figure 5:
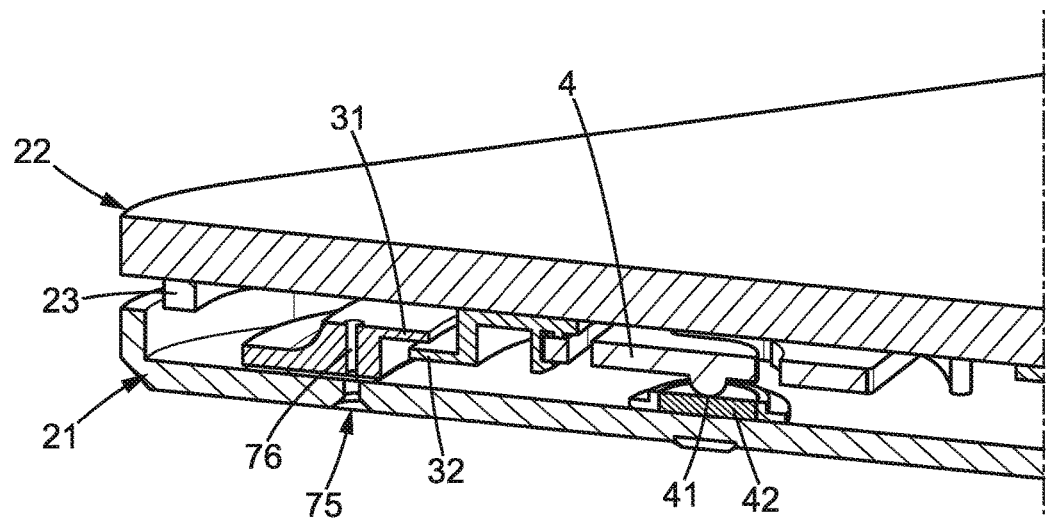
FIG. 5 is a more detailed sectional view of a corner, along line V-V shown in FIG. 2.
Figure 6:
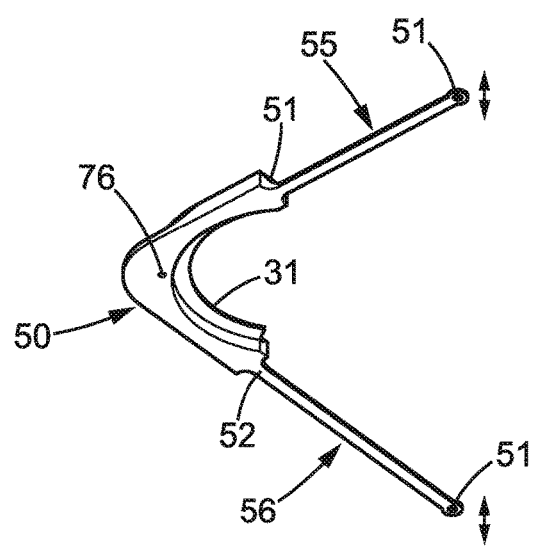
FIG. 6 shows in more details a linking unit.

Accordingly FIG. 2 shows various said arms 11X,11Y, 12X,12Y, 13X, 14X,14Y.

Each linking unit 11-14 comprises a centre portion 50 which is generally C-shaped, and two arms 55,56 extending from the centre portion 50. Each arm of said two arms extend perpendicularly to one another.

Each arm has an elongated shape with a first end 51 attached to the top plate and a second end 52 rigidly connected to the bottom plate. The first end 51 may be fixed by riveting or other equivalent technique.

Each arm is thin and can be flexed without resistance. However, each arm has a substantial strength along its longitudinal direction. Therefore, the relative movement of plates along X and along Y is prevented; thereby providing 'positive' guidance.

In the shown example, the length of the arms are about 50% of the side length LX,LY. Generally, we note that a good result is already achieved if the length of the arms>30% of the side length LX,LY.

Each linking unit 11-14 can be manufactured from plastic material; advantageously each linking unit is integrally formed as a single molded part (center portion and arms).

A plastic frame 6 is sticked to the top plate. This plastic frame 6 provides locating means for placing an Electronic Control Unit ECU 7, the display 85, the battery 82 and other items like the $CO_2$ sensor 84 and humidity/VOC sensors.

In particular, this plastic frame 6 provides locating means for placing and sticking the load cells 4 on the top plate at each corner.

Further, there is provided a USB port 28 on one side of the scale (a micro-USB type port). This USB port is used to recharge the battery and can be used to exchange data. There is also provided a small switch at the side of the USB port, which is used to wirelessly couple the scale with a remote device.

Figure 8A:
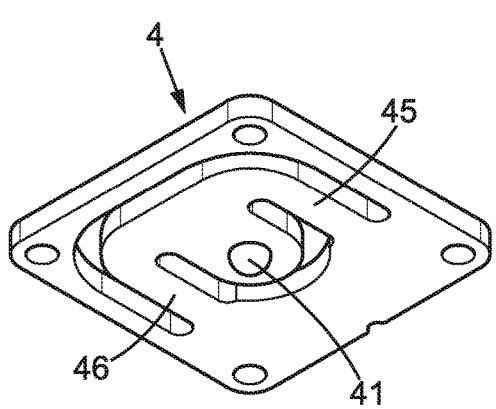
FIGS. 8A and 8B show one load cell in more details.
Figure 8B:
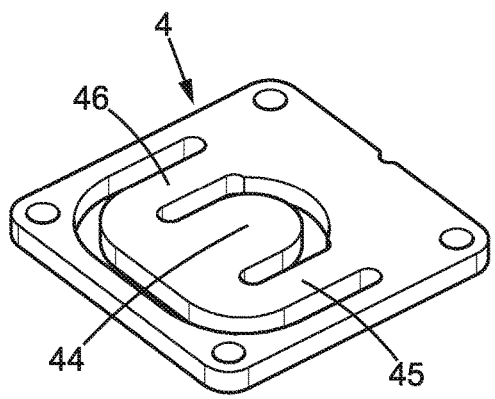

A shown in FIGS. 8A & 8B, each load cell 4 has a flexing beam arrangement with at least two strain gauges, among which one which extends under load and another one which shrinks under load.

Right beam 45 and left beam 46 can be equipped with strain gauge, whereas a center portion 44 is equipped with a rounded foot 41.

This kind of load cell is known per se and therefore not further detailed here.

Each load cell 4 comprises a round bearing foot 41; this allows small lateral sliding movement, which avoids parasitic stresses.

The center portion 50 of the linking units 11-14 is attached to the bottom plate, via screws 75 threaded in holes 76 provided in the center portion. Removing these screws allows disassembly of the scale.

Further, there are provided stop arrangements 3 to limit the gap between plates; it prevents the plates from moving away from one another when the user lifts the scale.

In the shown example there is provided a stop part 31 attached to the bottom plate and a counterpart 32 attached to the top plate.

The bottom plate stop part 31 is formed as an arcuate collar extending inwards from the centre portion 50 of the linking unit, located above the counterpart 32 attached to the top plate. The counterpart 32 attached to the top plate is also formed as a similar arcuate collar but extending outwards. Preferably, the counterpart 32 is formed integrally in the plastic frame 6.

When the user lifts the scale, it grasp the top plate 22 and pulls; the counterpart 32 attached to the top plate comes to contact the stop part 31 of the bottom plate 21, and thus cohesion of the scale is achieved so the whole scale is lifted.

A free play (without load or user lift action) is provided between stop part 31 and counterpart 32, such free play is typically between 0.3 mm and 1 mm.

Further, there is provided a peripheral joint denoted 23, to somehow close the side gap between plates. In the illustrated example, this joint is made of foam and does not interfere in the Z movement between top and bottom plates.

The bottom plate 21 is more generally called "first rigid plate"; the top plate 22 is more generally called "second rigid plate"; It must be understood that the role of first and second plates can be reversed.

Also the load cells 4 could be attached to the bottom plate instead of the top plate.

It is to be noted that the linking units 11-14 have a right angle shape otherwise generally like a square.

The centre remains free for lodging ECU, battery, etc.

The battery may be a lithium-ion battery; the battery may be a rechargeable battery. The battery has preferably a thickness less than 6 mm.

The thickness E of the scale is taken from the lower face of the bottom plate 21 to the upper face of the top plate 22. The thickness E is preferably below 20 mm. A thickness E of less than 19 mm, or even less than 18 mm can be achieved. This turns out to be the thinner bathroom scale on the market.

In order to achieve such small thickness, advantageously, some portions of the bottom plate 21 are thinner, at the location 29 of the battery, at the location 26 of the ECU, location 27 of the CO2/VOC sensor.

Figure 7:
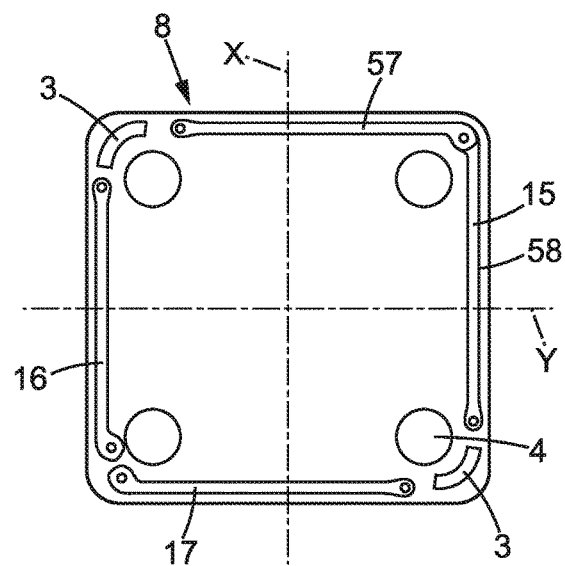
FIG. 7 shows another embodiment of a weighing scale.

FIG. 7 shows another embodiment, in which are illustrated other variants of linking units 15,16,17.

It should be noted that arms 57,58 are longer than in the above mentioned solutions. Practically, the length of the arms is here greater than 80% of the side length LX or LY.

The scale 8 may have wireless communication capability as taught in U.S. Pat. No. 8,639,226 of the same present applicant.

Communication with a smartphone allows entering user profiles on a smartphone application, profiles are down loaded in the scale; weight data is uploaded, at each measurement or in bulk. Personal history for each user can be displayed at the smartphone.

The scale may also exchange data with a personal activity tracker as taught in US-2015-0107910 of the same present applicant. The scale may also exchange data with a sleep assistant system.

The load cells may have their strain gauges arranged in a two-wheatstone bridge configuration as taught in US-2015-160068 of the same present applicant.

Also any substantial off-center position can be notified to the user as taught in US-2015-160068 of the same present applicant.

The off-center condition, especially along the left-right direction can otherwise be used to transmit controls to a game application (either on the smartphone or on a dedicated game device).

Also, the scale can recognize a particular user in a family of users, according to a likely range of weight, as taught in U.S. Pat. No. 8,639,226. If a possible ambiguity arises, the scale can display a choice between two likely users on the display, and the user can select one or the other via standing more on the right or more on the left side of the scale.

There may be provided conductive pads on the upper surface of the top plate 22. These pads are used to sense various impedance data from the base feet of the user, from which are inferred user ratio like the body fat percentage, water weight percentage, bone weight percentage, etc.

The heart rate can be computed by the scale from different method as taught in US2015338265 of the same present applicant.

Impedance measurements and ballistography techniques are also used to measure the blood pulse wave velocity in order to determine the arterial stiffness, mean arterial pressure and other data about arterial health of the user.

Also, a current $CO2$ concentration level can be sensed by the scale unit 8. A current VOC (Volatil Organic Compounds) concentration level can also be sensed by the scale unit.

Further, the scale performs automatic tare function such that the user does not need to wake-up the scale and wait before standing on it.

Also, the accurate value of the gravity prevailing at the considered geolocation is taken into account to refine the weight measurement. The geolocation can be transmitted by the smartphone application.

Various information can be displayed on the display of the scale unit, like all the above-mentioned data, but also the daily weather forecast, calendar events, instant messaging events, etc. . . . . .

The invention claimed is:

1. A thin weighing scale having an overall thickness of less than 25 mm, comprising:
    a first rigid plate, extending along a reference plane defined by a first direction and a second direction, wherein the first rigid plate forms a bottom plate,
    a second rigid plate, arranged parallel and at distance from the first rigid plate, with no direct contact between first and second rigid plates, wherein the second rigid plate forms a top plate and comprises a display, at least four load cells, each interposed between the first and second rigid plates, a set of linkages comprising at least four arms, among which at least two arms extend in the first direction and at least two other arms extend in the second direction, each arm having an elongated shape with a first end attached to the first rigid plate and a second end rigidly connected to the second rigid plate, whereby the second rigid plate is movably mounted with regard to the first rigid plate, substantially along a third direction perpendicular to the reference plane, the set of linkages preventing substantive relative movement between first and second rigid plates along the first and second direction, wherein there is provided at least two stop arrangements with a part rigid with the first rigid plate and a counterpart rigid with the second rigid plate, said part and counterpart coming into contact with one another to provide a limitation of relative movement along the third direction when lifting the scale by one of the first and second rigid plate.

2. The weighing scale of claim 1, wherein the set of linkages comprises at least two linking units, the at least four arms are formed in the linking units.

3. The weighing scale of claim 2, wherein the set of linkages comprises four linking units, each linking unit comprising two arms, one extending in the first direction and one extending in the second direction.

4. The weighing scale of claim 3, wherein each linking unit is provided with a stop arrangement.

5. The weighing scale of claim 1, wherein the scale exhibits a side length, wherein each of the arms extend over more than ⅓ of the side length.

6. The weighing scale of claim 1, wherein the overall thickness of the weighing scale is less than 20 mm.

7. The weighing scale of claim 1, wherein the first and second rigid plates are flat and have a constant thickness.

8. The weighing scale of claim 1, wherein the second rigid plate is made of glass.

9. The weighing scale of claim 1, wherein the arms are at the vicinity of the borders of the scale and the arms cover the peripheral area next to one another.

10. The weighing scale of claim 1, wherein the bottom plate is slightly smaller in the first direction and the second direction than the top plate.

11. The weighing scale of claim 1, wherein the linking units are L-shaped or Square-shaped and the internal corner lodges the corresponding load cell.

12. A thin weighing scale having an overall thickness of less than 25 mm, comprising:

a first rigid plate, extending along a reference plane defined by a first direction and a second direction, wherein the first rigid plate forms a top plate and comprises a display, a second rigid plate, arranged parallel and at distance from the first rigid plate, with no direct contact between first and second rigid plates, wherein the second rigid plate forms a bottom plate, at least four load cells, each interposed between the first and second rigid plates, a set of linkages comprising at least four arms, among which at least two arms extend in the first direction and at least two other arms extend in the second direction, each arm having an elongated shape with a first end attached to the first rigid plate and a second end rigidly connected to the second rigid plate, whereby the second rigid plate is movably mounted with regard to the first rigid plate, substantially along a third direction perpendicular to the reference plane, the set of linkages preventing substantive relative movement between first and second rigid plates along the first and second direction, wherein there is provided at least two stop arrangements with a part rigid with the first rigid plate and a counterpart rigid with the second rigid plate, said part and counterpart coming into contact with one another to provide a limitation of relative movement along the third direction when lifting the scale by the first plate.

13. The weighing scale of claim 12, wherein the set of linkages comprises at least two linking units, the at least four arms are formed in the linking units.

14. The weighing scale of claim 12, wherein the set of linkages comprises four linking units, each linking unit comprising two arms, one extending in the first direction X and one extending in the second direction Y.

15. The weighing scale of claim 12, wherein each linking unit is provided with a stop arrangement 3.

16. The weighing scale of claim 12, wherein the overall thickness of the weighing scale is less than 20 mm.

17. The weighing scale of claim 12, wherein the arms are at the vicinity of the borders of the scale and the arms cover the peripheral area next to one another.

18. The weighing scale of claim 12, wherein the first and second rigid plates are flat and have a constant thickness.

* * * * *